March 27, 1945.   F. GRIFFITH   2,372,486
BURR REMOVING TOOL
Filed Oct. 12, 1943
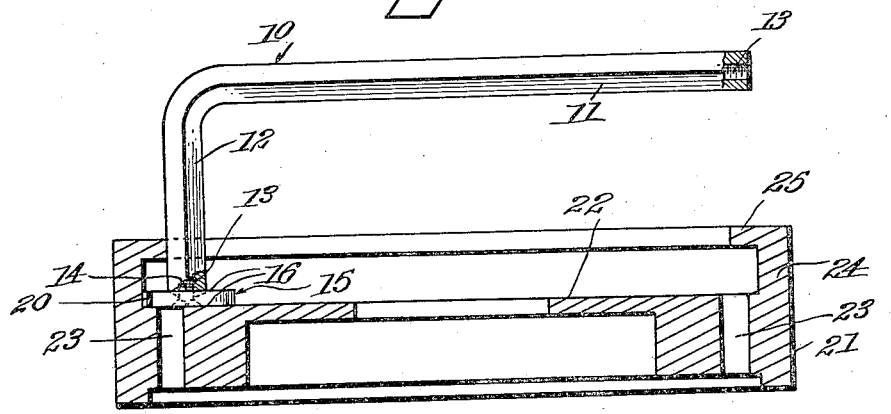
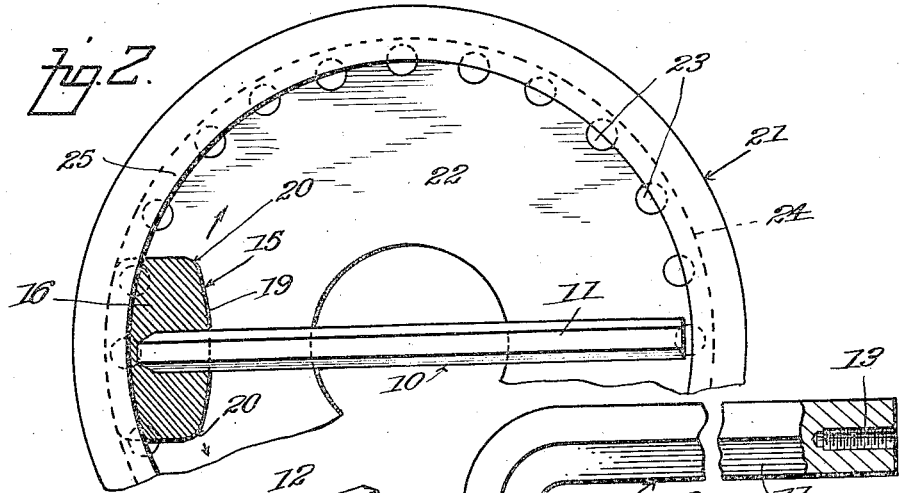
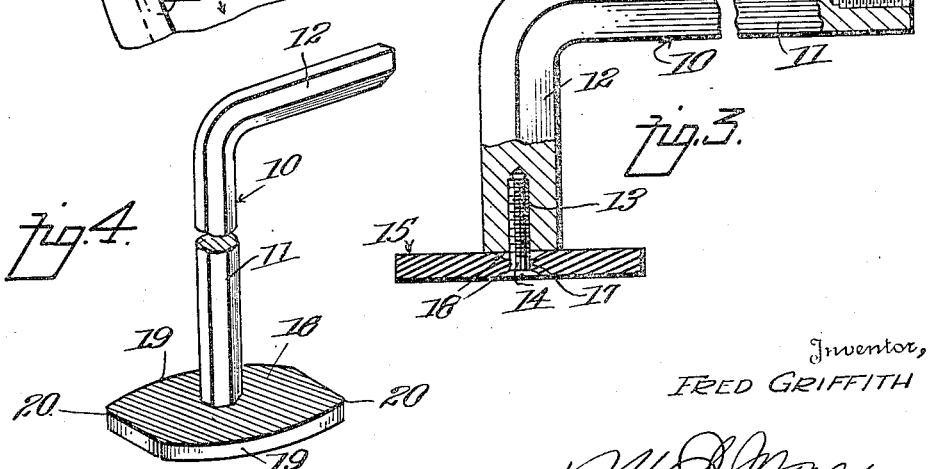
Inventor,
FRED GRIFFITH
Attorney.

Patented Mar. 27, 1945

2,372,486

UNITED STATES PATENT OFFICE 2,372,486

BURR-REMOVING TOOL

Fred Griffith, Cleveland, Ohio

Application October 12, 1943, Serial No. 505,988

4 Claims. (Cl. 29—78)

This invention relates to a burr removing tool.

In connection with the drilling of collars or other articles, especially where a multiplicity of holes are drilled, objectionable burrs result at surfaces which should be smooth for accurate fitting and operation. It is exceedingly difficult and laborious to remove such burrs with files or existing tools, and accordingly it is a prime object of the present invention to provide a tool or device adapted for expeditious manipulation to remove such burrs.

In carrying out the invention, I aim to provide a tool which is manually operable and has a shank provided with angularly arranged portions, either of which may be engaged by the hand and either of which may carry at either end, a filing element or burr remover which is selectively applicable to such ends.

I further provide the file element in the nature of a reversible part so that advantage may be taken of the filing teeth on opposite faces thereof, such an element as is attachable to the ends of the shank by a screw or the equivalent whose head is countersunk with respect to both faces of the filing element and provide such an element whose side edges are preferably curved or convexed in order to better fit the collar or other part and to enable manipulation without danger of the element binding or catching in the metal of the collar.

The more specific objects and advantages will become apparent from a consideration of the description following taken in connection with the accompanying drawing illustrating an operative embodiment by way of example.

In said drawing:

Figure 1 is a view showing the tool in side elevation, partly broken away, and in connection with a collar in the process of having the objectionable burrs removed therefrom, the latter being in diametric vertical section;

Figure 2 is a plan view of the parts of Figure 1, with the collar partly broken away;

Figure 3 is an enlarged elevation of the tool, with parts thereof broken away and in section to disclose details, and Figure 4 is a perspective view, partly broken away, of the tool.

Referring specifically to the drawing wherein like reference characters designate like or similar parts throughout the different views, the tool has a shank 10 preferably comprising portions 11 and 12, either of which is selectively adapted for engagement by the hand of the user and one of which, namely, the part 11 as shown, is preferably longer than the other part 12. The shank 10 may be of any desired cross sectional shape, for instance, hexagonal as shown.

In opposite ends of the shank, screw threaded holes or sockets 13 are provided which are selectively engageable by a screw 14 which detachably secures a burr removing block or element 15 thereof. This burr removing element on opposite surfaces thereof, has file teeth 16, the teeth of one face being at the opposite angle to the teeth of the other face, and it will be noted that the screw 14 passes through a hole 17 through such burr removing element and that the entrances to such hole at opposite faces of the element are countersunk as at 18. As a result, either face of the element 15 may be used to remove burrs, and thus I may take advantage of the filing surfaces of both faces 16 of the element 15.

Both longitudinal edges of the element 15 are curved or convexed as shown at 19, and all corners of such element are preferably rounded as at 20.

The tool is used, for example, in removing burrs from a collar as disclosed at 21, particularly resulting at a surface 22 thereof through the production of a multiplicity of drilled holes at 23. This collar is to be taken as representative of any part which is drilled and regardless of any particular machine where it is employed or use is to be made thereof.

In using the tool, usually the element 15 is fastened to the end of the longer shank portion 11 and such portion 11 is held vertically in the hand and moved over the surface 22 adjacent the drill holes 23 so that the flat contact of either surface 16 with the surface 22 will expeditiously remove, by filing, the objectionable burrs.

In many instances, a wall such as annular wall 24 rises from the surface 22 and has an inwardly extending flange or over-hang at 25.

Since in practically all instances, the collar has the extension wall 24, the curved edges 19 will approximately conform thereto to facilitate maximum movement of the element 15 thereover and the curved edges 20 will avoid biting of such element into the wall 24 and arresting or impeding the free movement of element 15 over the surface 22. When the element 15 is attached to the shoulder portion 12 of the shank, as shown in Figures 1 and 2, the element 15 will better reach under the over-hang or flange 25.

Various changes may be resorted to provided they fall within the spirit and scope of the invention as defined by the appended claims.

I claim as my invention:

1. A tool of the class described to remove burrs from the surface of an article having an annular wall rising from said surface, the tool having a relatively flat element provided with burr-removing teeth on its opposed surfaces, said element being elongated and having opposite edges convexed on approximately the same radius as said wall for bearing engagement with said wall during operation, said element having an opening therethrough with countersinks at each face, a shank of angular form having one angular portion longer than the other, and means to secure the element with either face against either of said ends, accommodated in the adjacent countersink.

2. A tool of the class described to remove burrs from the surface of an article having an annular wall rising from said surface, the tool having a relatively flat element provided with burr-removing teeth on a flat surface thereof, said element being elongated and having one long edge convexed on approximately the same radius as said wall for bearing engagement with said wall during operation, and an operating shank extending perpendicularly from the element with respect to said flat surface and spaced inwardly from said edge.

3. A tool of the class described to remove burrs from the surface of an article having an annular wall rising from said surface, the tool having a relatively flat element provided with burr-removing teeth on its opposed surfaces, said element being elongated and having opposite longitudinal edges convexed on approximately the same radius as said wall for bearing engagement with said wall during operation, an operating shank extending perpendicularly from the element with respect to its flat faces, and means to selectively secure said element with either face against said shank.

4. A tool of the class described to remove burrs from the surface of an article having an annular wall rising from said surface, the tool having a relatively flat element provided with burr-removing teeth on a flat surface thereof, said element having a convex edge, said edge being smooth to avoid marring of said annular wall in the event of contact therewith, an operating shank having portions angularly arranged and of different lengths, and means to secure the element to the shank at either end of the latter with the respective portions perpendicular to the element and inwardly from said edge.

FRED GRIFFITH.